3,291,751
PREPARATION OF A CATALYST CONTAINING A MOLYBDENUM COMPOUND DISPERSED WITHIN ALUMINA
Waldeen C. Buss, Pinole, Calif., assignor to Chevron Research Company, a corporation of Delaware
No Drawing. Filed Jan. 30, 1964, Ser. No. 341,438
6 Claims. (Cl. 252—439)

This invention relates to a method for preparing gel catalysts comprising a molybdenum compound dispersed within alumina, said catalyst being particularly useful for catalyzing hydrodenitrification and/or hydrocracking reactions.

As is well known to those skilled in the catalyst art, a gel, including both xerogels or aerogels, is produced by dehydration, generally by heating, of a hydrogel which is herein defined as a solid material containing both the solid phase of a colloidal solution and the imbibed liquid phase. It is also well known that metal oxide-containing gels have long been employed as catalysts and/or catalyst supports. Numerous methods of making such composites have been suggested, most of which have been directed to the particular components of the initial gel, the manner of forming the gel, and in various techniques for removing undesirable components from the formed gel. The present invention is directed to a specific method for making catalysts of particular compositions, namely, gels containing, as necessary components, at least one compound of molybdenum microscopically dispersed within alumina in the form of a gel.

The method of the present invention comprises the following steps: (a) forming an aqueous mixture comprising aluminum chloride and a solution of at least one compound selected from the group consisting of solutions of ammonium molybdate and molybdenum oxychloride, (b) adding to said mixture from about 1.0 to 3.0 mols of at least one oxirane containing from two to three carbon atoms per molecule per mole of chloride ions in said mixture, thereby forming a hydrogel, and (c) dehydrating said hydrogel to produce said gel.

Several preferred modifications to the noted method, as well as particular compositions of catalysts, will be fully disclosed below, but can be briefly described here as follows:

A preferred modification in the method of producing the catalyst (referring to the steps outlined above) involves slurrying (in a solvent) the hydrogel produced in step (b), recovering the resulting solid phase hydrogel from the slurry and thereafter converting the recovered hydrogel into a gel in the manner of step (c). It has been found that such a slurrying operation removes organic materials associated with the hydrogel, as by occlusion, and allows the dehydration operation to be conducted without excessive temperature run-aways due to burning of the organic material, such run-aways often leading to catalyst surface area loses by sintering.

In addition, preferred catalyst compositions of the gel catalyst exist and are preferred for the reason that they are particularly efficacious for catalyzing the reactions of hydrodenitrification and/or hydrocracking. Among these compositions are catalysts, prepared according to the present method, comprising molybdenum sulfide and nickel sulfide intimately dispersed within alumina or silica-alumina. Further, these preferred compositions also include preferred metal levels of the molybdenum and nickel compounds present within the gel composite.

As a requisite to the present method, it is necessary that all of the components be cogelled simultaneously. Thus, cogelation of two components to produce a gel and thereafter impregnating a third component upon the gel is outside the contemplation of this invention. It has been found that catalysts produced by simultaneous congelation are very much superior to multi-component catalysts produced by other methods such as by impregnation of a single oxide support, or even those made by impregnating a third component on a coprecipitated two-component carrier. This marked superiority has been exemplified in a comparison of numerous catalysts. For example, molybdenum sulfide and nickel sulfide hydrogenating components dispersed within alumina prepared according to the present method have been found to possess superior catalyst activities in hydrodenitrification to catalysts of the exact composition prepared by sequentially impregnating an alumina support with nickel and molybdenum compounds and thereafter converting the molybenum and nickel components to their corresponding sulfides. The reason for this superiority is not completely understood but it is believed that the intimate uniform dispersion of the components, and/or compound formation, that probably exists throughout the hydrogel, and thus the gel, produced by the present method, leads to these improved results. Because of this uniform dispersion, the hydrogel is herein referred to as a microgel, and the gel, formed therefrom called a dried microgel.

The first step in preparing a catalyst according to the present invention requires the formation of an aqueous, or alcoholic, or mixed aqueous-alcoholic mixture containing, as a bare minimum, aluminum chloride and, either or both, ammonium molybdate and/or molybdemum oxychloride. Since aluminum chloride and ammonium molybdate are well-known articles of commerce, no description other than their designation is needed, except that it is desirable that these chemical compounds be of relatively high purity. If molybdenum oxychloride is to be employed as a component of the metal mixture, it can be prepared, for example, by the following procedures. Solid moybdenum oxide ($MoO_3$) can be contacted with HCl gas at a temperature of from about 350° to 500° F. to produce a solid complex compound apparently consisting of $MoO_3 \cdot 2HCl$ or $MoO_2Cl_2 \cdot H_2O$. This latter composite, herein termed molybdenum oxychloride, is readily soluble in water or a lower alcohol such as methanol. Another way of preparing the molybdenum oxychloride in solution is to react molybdic acid (likewise an article of commerce containing approximately 85% $MoO_3$) with concentrated HCl (37 to 38 weight percent HCl). If it is desired to use the molybdenum oxychloride as the source of molybdenum in the preparation of the gel catalyst, it is preferred to use the molybdic acid method because of its simplicity.

In forming the initial mixture of aluminum chloride and the molybdenum component, various solvents can be employed. If molybdenum oxychloride is used, the solvent can be water alone, a lower alcohol alone, or mixtures of water and at least one alcohol. If ammonium molybdate is used, the solvent can be either water or water-alcohol mixtures. Preferably, a mixture of water and such alcohols as methanol and/or ethanol are employed in the initial mixture. Thus, I have found that if the initial mixture is formed into a solution by water and from about 5 to 40 percent alcohol (based on the total amount of water used), that formation of the desired hydrogel is excellent. Other organic solvents that can be employed are acetone, methyl ethyl ketone, dimethyl formanide or mixtures thereof.

In addition to the aluminum and molybdenum components present in the initial mixture, it is often desirable to include other catalytic materials therein. Thus, by the inclusion of soluble salts of such metals as vanadium, chromium, tungsten, manganese and the Group VIII metals, the compounds or metals of which are hydrogenating components when in the gel, a variety of catalysts can be produced. Also, soluble compounds of magnesium, silicon, titanium, thorium, zirconium and the rare earths, can be included within the metal mixture so that when the final gel is produced, these compounds will be present in the form of their oxides and will modify the catalytic effect of the alumina and contribute their various catalytic properties to the final catalyst. In some cases, as in the situation where it is desired that the final catalyst contain relatively large amounts of silica, the silicon component should be present in the initial mixture as a silica sol, with the other components intimately dispersed therein. In such a case, the silica sol can be made by any conventional procedure, of which many are known by those skilled in the catalyst art. For example, silica sols can be made by hydrolyzing tetraethyl orthosilicate with an aqueous HCl solution, generally in the presence of such solvents as alcohols containing 1 to 4 carbon atoms per molecule, acetone, methyl ethyl ketone, or the like. Preferably, alkali metals and alkaline earth metals are avoided in manufacturing the silica sol because such metals have often been found to adversely affect the activity of some catalysts.

Wide ranges of varying concentrations of metal compounds in the hydrogel can be produced by the subject process by merely regulating the amount of each metal compound in the initial solution or, in the case of silica-containing hydrogel, sol. The relative concentrations of the metal compounds in the hydrogel are only dependent upon the concentration actually desired by the producer. Thus, molybdenum compound and alumina gel catalysts, incorporating any desired additional components described above, can be easily tailored to produce hydrodenitrification, hydrocracking, reforming, etc. catalysts of any particular composition sought by the producer.

It can be seen that catalysts having a tremendous number of possible compositions can be readily made by the present invention. However, a particularly preferred type of catalyst suitable for use as a hydrodenitrification and/or single-stage hydrocracking catalyst can be advantageously produced by the subject method. This preferred catalyst comprises molybdenum sulfide and nickel sulfide dispersed within alumina. The amount of molybdenum, calculated as the metal and based on the weight percent of the final catalyst, within this catalyst is in the range of from about 10 to 40 percent, and the amount of nickel, calculated in the same manner, is in the range of from about 5 to 18 percent, with the remainder being alumina. More preferably, the catalyst contains (calculated as the metals) from about 15 to about 35 percent molybdenum and about 6 to about 14 percent nickel, both substantially in the form of their sulfides, with the remainder alumina.

The actual order of mixing the components into the initial mixture is not critical, particularly when, as in almost all situations, the mixture is a solution. In the case of where the initial mixture includes a sol, as in the case where silica is desired in the catalyst, the sol can be first formed with subsequent addition of the molybdenum component and aluminum chloride (or other soluble metal chlorides if they are also desired in the final catalyst), or the sol can be formed as the last step by adding, for example, the silicon compound to a mixture containing all of the other metal compounds.

The initial mixture of metals is reacted with a quantity of at least one epoxy compound, namely, an oxirane containing from 2 to 3 carbon atoms per molecule, which includes ethylene oxide, propylene oxide and epichlorohydrin. The amount of oxirane reacted can be expressed in the mol ratio of the oxirane to the number of chloride ions, or reactive groups, present in the mixture. This ratio should be from about 1.0 to 3.0, although larger ratios can be employed but to no particular advantage. However, there should generally be an excess of the epoxy compound present to assure complete reaction of the reactive groups, such as the chlorides. The actual order of forming the mixture and the addition of the oxirane is not important so long as a homogeneous mixture of the oxirane and all of the metal compounds is formed before the metal components set into a hydrogel. Thus, for example, the oxirane, or mixtures of oxiranes, can be added to only one of the metal chlorides, and the other metal compounds and/or sol can be added to this so long as this latter addition is done before the reaction between the epoxide and the first metal chloride results in a single component hydrogel.

Following the addition of the oxirane, the resulting mixture will set into a hydrogel after a period of from a few seconds to several hours depending upon the concentration of the component, the temperature, and the particular solvent or combination of solvents employed. This hydrogel can be dried by conventional methods, such as by evaporation of the solvents. This dried gel will still contain about 30 weight percent water. This is then further dehydrated to convert substantially all of the components to their corresponding oxides. For example, this dehydration can be accomplished by heating from about 700° to 1000° F. at atmospheric pressure. Other dehydrating methods are known to those familiar with catalyst manufacturing techniques. This, and the subsequently described dehydration methods, which are hereby defined as the conversion of a hydrogel to a gel whose components are essentially in the oxide form, produce gels having relatively high surface areas, generally in excess of 100 m.$^2$/g. (square meters per gram).

One preferred method of dehydrating the hydrogel, particularly a hydrogel containing both molybdenum and nickel compounds dispersed within the aluminum compound, leads to a catalyst having particularly good surface areas and activities. This method involves the steps of drying the hydrogel to a temperature from about 200 to 350° F., further dehydrating the hydrogel by increasing the temperature up to about 900° to 950° F. by contact with a heated oxygen-containing gas containing less than about five volume percent oxygen, and thereafter completing the dehydration by calcining the composite in air at a temperature in the range of from about 900° to 1000° F. By controlling the oxygen concentration during the drying step wherein the temperature is increased to 900° to 950° F., temperature run-aways, due to the burning of organic material associated with the hydrogel, are kept in check with the result that the hydrogel or gel is not subjected to excessive temperatures that reduce catalyst surface area by sintering.

I have also found that another preferred dehydration method will alleviate the problem of the burning of organic material during dehydration without having to resort to the procedure of controlling the oxygen concentration during heating. I have found that if an intermediate step is employed between the formation and dehydration of the hydrogel, that the hydrogel can be directly dehydrated by heated air. This preferred method involves contacting the initially formed hydrogel with from about 1 to 5 volumes of a solvent, such as water, per volume of solid hydrogel so as to form, upon agitation, a slurry. The solid hydrogel phase is then recovered from the slurry, as by filtration, and, if desired, reslurried with the solvent one or more times. Whether slurried once or more than once, the finally recovered hydrogel can then be dehydrated as described above. Of course, a combination of the two described preferred methods of dehydration is especially advantageous in that complete protection of the surface area of the catalyst is assured. Furthermore, for a reason not completely understood, such a combination produces a gel that is more easily pelleted, in which form the catalyst is especially suitable for handling and loading in reactor vessels.

When it is desired to have the hydrogenating components, i.e., nickel, molybdenum, etc., in the form of their corresponding sulfides, this can be done, following dehydration, by contacting the gel with a mixture of hydrogen and a sulfur-containing compound, such as dimethyl disulfide, H₂S, etc., at a temperature of from about 350° to 850° F., and preferably from about 500° to 750° F. Further, the sulfiding can be done in situ, i.e., within the reaction zone itself.

The following examples will give some indication of the varying gel catalysts that can be produced by the method of the present invention.

EXAMPLE 1

275 grams of molybdic acid (87.1% MoO₃) was dissolved in a solution of 330 ml. of concentrated HCl (37-38% HCl) and 40 ml. of water by adding the molybdic acid powder slowly accompanied by vigorous shaking. The resulting yellow solution was poured into 7.3 liters of water. 242 grams of NiCl₂·6H₂O and 1,280 grams of AlCl₃·6H₂O were then added and stirred until a green solution resulted. Then 1.2 liters of methanol were added and stirred. The resulting clear, green solution was then cooled to 74° F. and to it was slowly added 2.95 liters of propylene oxide, accompanied by cooling and stirring with the solution temperature maintained from 72° to 84° F. during the oxirane addition. The solution was allowed to stand at room temperature. After about one hour, gelation began and was allowed to continue for two additional hours. The hydrogel was then broken into small lumps and dried in an air oven at 260° F. for 16 hours.

A portion of the partially dried hydrogel was then placed in a vertical, cylindrical container and heated by a downward gas flow as follows. The particles were first heated to 500° F., then additionally heated to 700°–750° F. in nitrogen. They were then contacted with dilute air (as employed in all of the examples, the term "dilute air" means that the gas contained less than 5 volume percent oxygen) at 500° F., then dilute air at 800° to 900° F., and then straight air at 800° to 900° F. The particles were then calcined in air for 3.5 hours at 850° to 730° F. These heating operations completed the dehydration of the hydrogel to a gel whose nickel, molybdenum and aluminum components were all present as oxides. The gel, with a surface area of 281 m.²/g. was composed of 8.7 weight percent nickel and 24.0 weight percent molybdenum (percentages based on the metallic form) with the remainder alumina. This gel, with the nickel and molybdenum components substantially in the sulfide form (performed in the manner described below), is herein termed Catalyst A.

EXAMPLE 2

143 grams of ammonium molybdate $$[(NH_4)_6Mo_7O_{24}\cdot 4H_2O]$$

were dissolved in 3.5 liters of distilled water. To this was added 440 grams of AlCl₃·6H₂O and stirred until dissolved. Then, 123 grams of NiCl₂·6H₂O was added and dissolved, followed by the addition, with stirring, of 570 ml. of methanol. The resulting solution was cooled to 80° F. Then, 936 ml. of propylene oxide was slowly added, accompanied by stirring. The mixture was allowed to stand at room temperature, during which period the temperature increased to 95° F. and gelation occurred. The resulting hydrogel was then partially dried in flowing air for 16 hours at 260° F.

The partially dried hydrogel, in particulate form, was then placed in a vertical cylindrical container and contacted, with downward flow, in the following sequence:
(1) Heated to 500° F. in nitrogen;
(2) Heated at 500° F. in dilute air;
(3) Heated at 500° F. in straight air;
(4) Heated to 850° F. in nitrogen;
(5) Heated at 850° F. in dilute air;
(6) Heated at 850° F. in straight air; and
(7) Heated to 900° F. in straight air for 4 hours.

The resulting dehydrated hydrogel (now a gel), had a surface area of 284 m.²/g. and a composition of 12.1 weight percent nickel, 30.6 weight percent molybdenum (both calculated as the metal), with the remainder Al₂O₃. After sulfiding, this catalyst is herein referred to as Catalyst B.

EXAMPLE 3

49.6 grams of molybdic acid was dampened with methanol and then dissolved in 72 ml. of concentrated HCl (37–38% HCl). This solution was poured into a second solution composed of 327.5 grams of $$AlCl_3\cdot 6H_2O$$

dissolved in 1.52 liters of distilled water. To the resulting solution was added 31.7 grams of NiCl₂·6H₂O and stirred until it too dissolved. Then, 250 ml. of methanol was dissolved therein. The resulting solution was then cooled to 70° F. and maintained at 70° to 85° F. while 720 ml. of propylene oxide were added. The solution was allowed to stand at room temperature until gelation, the latter occurring at a temperature of 87° F. The resulting hydrogel was then partially dried in air at 260° F. overnight.

A portion of this partially dried hydrogel was broken up and inserted into a vertical cylindrical vessel located in a furnace. The particles were first heated to 500° F., and then up to 900° F., in nitrogen. They were then cooled to 700° F., contacted with dilute air at 700° F., straight air at 700° F., dilute air at 900° F., straight air at 900° F., and, finally, straight air at 900° F. to 930° F. for 4 hours. The resulting gel had a surface area of 343 m.²/g., and a composition of 6.4 weight percent nickel, 22.5 weight percent molybdenum (both calculated as the metals) with the remainder alumina. After sulfiding, this gel is herein referred to as Catalyst C.

EXAMPLES 4–7

Four additional gels were made in the same manner as described in Example 3 except for differences in the concentrations of metal salts employed in the initial solutions. The compositions and surface areas of these gels are indicated below. After contacting these gels with a sulfiding agent in the manner described below, the resulting sulfided catalysts were termed as indicated.

| Catalyst | D | E | F | G |
|---|---|---|---|---|
| Surface area, m.²/g | 399 | 213 | 288 | 252 |
| Composition, weight percent: | | | | |
| Nickel (as the metal) | ¹ 6.5 | ¹ 13.2 | 13.5 | 6.7 |
| Molybdenum (as the metal) | ¹ 16.8 | ¹ 35.3 | 22.3 | 29.7 |
| (Remainder Alumina.) | | | | |

¹ Calculated.

EXAMPLE 8

For comparative purposes only, a catalyst having a composition almost identical to Catalyst A of Example 1 was prepared by a conventional impregnation of an alumina support in the following manner.

A commercial ⅛ inch alumina extrudate was crushed to 16–42 mesh and calcined at 900° F. in air for four hours. 335 grams of this calcined alumina was impregnated with 291 ml. of a solution of 584 grams of $$Ni(NO_3)_2\cdot 6H_2O$$

in sufficient water to make 800 ml. of solution. The impregnated alumina was then dried for seven hours at 400° F., four hours at 900° F., and 380 grams of nickel impregnated alumina were recovered. An ammonium molybdate solution was prepared by dissolving 350 grams of (NH₄)₆Mo₇O₂₄·4H₂O in 350 ml. of water plus 350 ml. of concentrated NH₄OH so as to produce 725 ml. of solution. The 380 grams of nickel impregnated alumina was then impregnated with 290 ml. of the ammonium molybdate solution, dried for 9 hours at 400° F., four hours at 900° F., and 488 grams of impregnated alumina recovered. This product was then again impregnated with about 270 ml. of the same ammonium molybdate solution, dried nine hours at 400° F., and four hours at 900° F.

Fifty grams of the resulting triple impregnated alumina was then impregnated with 25 ml. of a solution containing 5.84 grams of $Ni(NO_3)_2 \cdot 6H_2O$, dried nine hours at 400° F., and then four hours at 900° F. An ammonium molybdate solution was prepared containing 1700 grams of $(NH_4)_6Mo_7O_{24} \cdot 4H_2O$, 1700 ml. of water, and 1700 ml. of concentrated $NH_4OH$ solution and it contained 20.1 percent molybdenum. 2.1 ml. of this solution was diluted to 25 ml. with water and the mixture used to impregnate the catalyst. It was then dried nine hours at 400° F. and then four hours at 900° F. This catalyst contained 8.96 weight percent nickel, 24.7 weight percent molybdenum (calculated as the metals), and the remainder alumina. After sulfiding, this catalyst was called Comparative Catalyst H.

Catalysts A–G are excellent catalysts for hydrodenitrification and/or hydrocracking and are much superior to catalysts of the same composition that are prepared by conventional impregnation techniques, the latter exemplified by Comparative Catalyst H of Example 8. The effectiveness of the catalysts prepared according to the present method and their superiority over conventional catalysts is demonstrated by their actual use as denitrification and hydrocracking catalysts. The test procedure employed was identical in all runs.

The test involved charging a reactor with particles (48–100 mesh) of the gel, i.e., the particles comprised intimately admixed oxides of nickel, molybdenum and aluminum. The nickel and molybdenum components were then substantially converted to their corresponding sulfides in situ, i.e., within the reactor, by the steps (1), heating the gels to a temperature of 600° F. in the presence of hydrogen, and (2), contacting the gels with hydrogen, to which dimethyl disulfide is added, at a temperature of 600° F. and pressure of 1200 p.s.i.g. The resulting $H_2S$–$H_2$ mixture had a $H_2S$ to $H_2$ ratio of about 0.02.

The test feed was a California (Midway) straight run distillate containing, as an average, 4500 p.p.m. nitrogen (total) and 0.96 percent sulfur, all of which were present as nitrogenous and sulfurous organic compounds. The gravity was 17.0 API at 60° F. The feed had A.S.T.M. D–1160 distillation points as follows:

| | °F. |
|---|---|
| Start | 622 |
| 5% | 681 |
| 10% | 706 |
| 30% | 743 |
| 50% | 770 |
| 70% | 797 |
| 90% | 833 |
| 95% | 850 |
| E.P. | 882 |

In all tests, runs were conducted at a reaction temperature of 750° F., a total pressure of 1200 p.s.i.g., a liquid hourly space velocity (LHSV) of 1.33, and a hydrogen rate of 4000 standard cubic feet (s.c.f.) per barrel (B) of feed. Each run lasted from 20 to 23 hours with product analysis being conducted on the last 4 to 5 hour sample. The analysis determined the nitrogen level of the $C_5$ plus liquid product. From these data, the denitrification rate constant (DRC), the pseudo first order constant, was determined and employed as a measure of denitrification. The DRC was determined as follows:

$$DRC = LHSV \ln N_F/N_P$$

wherein LHSV is the space rate, $N_F$ is the total nitrogen in the feed in parts per million (p.p.m.), and $N_P$ is the total nitrogen, in p.p.m., in the $C_5+$ portion of the product. The higher the DRC, the better the catalyst is for denitrification. The relative hydrocracking activities of the catalysts were also determined. As used in these test runs, the percent cracking is defined as the percentage conversion of the feed to liquid products boiling below 650° F. The results of the test runs on Catalyst A through Comparative Catalyst H are shown in the following table. Although the molybdenum and nickel components are substantially in the form of their sulfides, the compositions in the table are given in weight percent as the metals.

Table

| Catalyst | Ni, percent | Mo, percent | Cracking, percent | DRC |
|---|---|---|---|---|
| A | 8.7 | 24.0 | 32 | 4.2 |
| B | 12.1 | 30.6 | 30 | 3.9 |
| C | 6.4 | 22.5 | 32 | 2.9 |
| D | ¹6.5 | ¹16.8 | 26 | 2.0 |
| E | ¹13.2 | ¹35.3 | 28 | 3.1 |
| F | 13.5 | 22.3 | 30 | 3.2 |
| G | 6.7 | 29.7 | 31 | 3.4 |
| H | 8.96 | 24.7 | 24 | 1.8 |

¹ Calculated.

From the table it can be seen that all of the catalysts prepared according to the present invention (Catalysts A–G) were superior denitrification and hydrocracking catalysts to the conventional impregnated Comparative Catalyst H. It should be especially noted that, whereas Catalyst A and Comparative Catalyst H have almost identical compositions, the former was so far superior in both denitrification and hydrocracking that the difference amounts to one of kind and not merely of degree.

EXAMPLE 9

This example shows the advantages of slurrying and filtering the hydrogel prior to dehydration.

273 grams of molybdic acid were moistened with about 80 ml. of methanol and then dissolved, by shaking, in 396 ml. of concentrated HCl (37–38%). This solution was then added to another solution consisting of 1.2 liters of methanol and 7.3 liters of distilled water. To the resulting solution was added 1280 grams of $AlCl_3 \cdot 6H_2O$ and 242 grams of $NiCl_2 \cdot 6H_2O$. The resulting solution was cooled to about 70° F. and 2.38 liters of propylene oxide were slowly added while maintaining the temperature within the range of 70° to 80° F. Before gelation, the mixture was divided into a number of portions and allowed to gel by standing at room temperature. Gelation began about 20 minutes after addition of the oxirane.

A portion (Portion X), amounting to about two liters of hydrogel, was broken into lumps and then dried in an air oven for 17 hours at 200° F. It was then further dried by air at a temperature of from 250° F. to 260° F. for about three days. A portion of this partially dried hydrogel was then crushed, mixed with 5% Sterotex (a commercial vegetable product lubricant used extensively in the catalyst art for aiding the formation of pellets), and then formed into pellets with a ⅛ inch punch. The pellets were then dehydrated by, (1) contact with nitrogen for four hours at 500° F.; (2) heating to 900° F. and keeping the temperature at 900° F. with nitrogen; (3), contacting the particles with dilute air at 700° F. and then further heating with the dilute air to 900° F.; and (4), heating the pellets for four hours at 900° F. in straight air.

A number of these pellets were then individually tested to determine their crushing strength by inserting a pellet between two flat plates and applying pressure to the topmost. The average crushing strength of these pellets was 6.9 pounds.

Another portion (Portion Y) of the non-dried hydrogel was then treated according to the preferred method previously referred to. Portion Y, amounting to about one liter of hydrogel, was chopped into small particles and then slurried with two liters of distilled water. The slurry was filtered and the recovered cake was again slurried with two liters of distilled water. After filtration and recovery of the solid hydrogel cake, it was dried for 17 hours in an air oven at 260° F. It was then crushed, mixed with 4% Sterotex and pellets formed with the same ⅛ inch punch. The pellets were then dehydrated in the same manner as Portion X described above. The average crushing strength of these pellets was 12.1 pounds, almost double that of the unslurried gel produced from Portion X. Inasmuch as high crushing strengths are desirable for practical reasons of attrition resistance, prevention of the formation of catalyst fines that lead to excessive pressure drops within catalyst beds, etc., the advantages of this preferred interstage slurrying operation are apparent.

EXAMPLE 10

This example shows how the present invention can produce silica-containing catalysts.

9.36 grams of molybdic acid and 181 grams of $AlCl_3 \cdot 6H_2O$ were dissolved in 2.25 liters of methyl alcohol containing 24 ml. of 37 percent HCl. To this was added 52 grams of $SiO_4(C_2H_5)_4$ and 300 ml. of water. The resulting silica sol-containing mixture was then cooled to 55° F., and 500 ml. of propylene oxide added. After formation of the hydrogel, it was allowed to stand overnight and then dehydrated by oven drying at 250° F. for 24 hours, heating in air for four hours at 450° F. and thereafter heating in air (in a muffle furnace) at 1000° F. for four hours. The resulting gel (xerogel) was then contacted for one hour with flowing hydrogen at 800° F., and was then sulfided by contact with a mixture of hydrogen and $H_2S$ (1 to 1 mol ratio) for one hour at a temperature of 600° F.

The finished catalyst had a composition, in weight percent, of 13 percent $MoS_2$ (about 8% molybdenum), 62% $Al_2O_3$ and 25% $SiO_2$. The catalyst had a surface area of 446 m.²/g.

Catalysts prepared according to the present invention are particularly suitable for the hydrodenitrification and/or hydrocracking of feedstocks boiling in the range of from about 350° to 1400° F. or more, and, particularly, in the range of from about 600° to 1200° F. Since the catalysts can hydrocrack and denitrify nitrogen and/or sulfur containing feeds, such feedstocks as straight-run or cracked distillates (including cycle oils and gas oils), deasphalted heavy petroleum fractions, topped crudes, shale or tar sand oils, are all suitable. Although nitrogen-free fractions are easily converted by these catalysts with excellent results, so too are those nitrogen-containing stocks that have heretofore often been required to be hydrofined prior to hydrocracking.

The hydrocracking and/or hydrodenitrification process employing these catalysts can be conducted at temperatures of from about 500° to about 1000° F., and, preferably, from about 650° to 850° F. Suitable pressures are from about 300 to 3000 p.s.i.g. or more, but the preferred range is from about 500 to 2000 p.s.i.g. LHSV's of from 0.1 to 10 are quite suitable. The reactions are also conducted in the presence of added hydrogen, the amount being at least 500 s.c.f., and normally 750 to 5000 s.c.f., per barrel of feed. Pure hydrogen or hydrogn-light-hydrocarbon mixtures, such as is recovered from catalytic reformers, are suitable as the added hydrogen source. Also, the catalysts can be employed in any type feed-catalyst contacting system, such as fixed-bed, moving bed, slurry, or fluid catalyst operations. Fixed-bed operations are generally preferred. Catalyst regeneration can be accomplished by conventional techniques employing oxygen-containing gases at elevated temperatures.

Although only specific catalysts and methods of their manufacture have been described, certain variations in the catalysts and their use can be made without departing from the spirit of the invention, and all such variations that fall within the scope of the appended claims are intended to be embraced thereby.

I claim:

1. The method for producing a gel comprising molybdenum oxide microscopically dispersed within alumina which comprises the steps: (a) forming a mixture comprising aluminum chloride and a solution of at least one compound selected from the group consisting of solutions of ammonium molybdate and molybdenum oxychloride, (b) adding to said mixture from about 1.0 to 3.0 mols of at least one oxirane containing from 2 to 3 carbon atoms per molecule per mol of chloride ions in said mixture, thereby forming a hydrogel, and (c) dehydrating said hydrogel by the steps comprising heating said hydrogel with an oxygen-containing gas containing less than about 5 volume percent oxygen to a temperature in the range of from about 900° to 950° F. and thereafter calcining the resulting molybdenum oxide and alumina-containing gel in air at a temperature of from about 900° to 1000° F.

2. The method for producing a gel comprising molybdenum oxide microscopically dispersed within alumina which comprises the steps: (a) forming a mixture comprising aluminum chloride and a solution of at least one compound selected from the group consisting of solutions of ammonium molybdate and molybdenum oxychloride, (b) adding to said mixture from about 1.0 to 3.0 mols of at least one oxirane containing from two to three carbon atoms per molecule per mol of chloride ions in said mixture, thereby forming a hydrogel, (c) slurrying said hydrogel by adding solvent thereto, (d) filtering the resulting slurry and recovering the solid phase therefrom, and (e) dehydrating said solid phase by the steps comprising heating said solid phase with an oxygen-containing gas containing less than about 5 volume percent oxygen to a temperature in the range of from about 900° to 950° F. and thereafter calcining the resulting molybdenum oxide and alumina-containing gel in air at a temperature of from about 900° to 1000° F.

3. A method for producing a gel catalyst consisting essentially of molybdenum sulfide and nickel sulfide microscopically dispersed within alumina which comprises the steps: (a) forming an aqueous-alcoholic mixture containing aluminum chloride, nickel chloride and a solution of at least one compound selected from the group consisting of solutions of ammonium molybdate and molybdenum oxychloride, (b) adding to said mixture from about 1.0 to 3.0 mols of propylene oxide per mol of chloride ions in said mixture, thereby forming a hydrogel, (c) dehydrating said hydrogel by the steps comprising heating said hydrogel with an oxygen-containing gas containing less than about 5 volume percent oxygen to a temperature in the range of from about 900° to 950° F. and thereafter calcining the resulting molybdenum oxide, nickel oxide and alumina-containing gel in air at a temperature of from about 900° to 1000° F., and (d) contacting said gel with a mixture of hydrogen and a sulfur-containing compound at a temperature of from about 350° to 850° F. to substantially convert said molybdenum and nickel components in the gel to their corresponding sulfides.

4. The method of claim 3 wherein the concentrations of the nickel and molybdenum compounds in said aqueous-alcoholic mixture is such that the final gel catalyst comprises from about 5 to about 18 weight percent nickel and from about 10 to about 40 weight percent molybdenum, the amount of said metals being calculated as the metal and based on the weight percent of the final catalyst.

5. The method of claim 3 wherein, following step (b), the hydrogel is slurried with a solvent, the solid phase of said slurry being recovered and said solid phase being thereafter treated in the same manner as steps (c) and (d) of claim 3.

6. The method of claim 5 wherein the hydrogel is slurried with water as said solvent.

(References on following page)

References Cited by the Examiner

UNITED STATES PATENTS

| | | | |
|---|---|---|---|
| 2,338,089 | 1/1944 | Bond | 252—451 |
| 2,708,187 | 5/1955 | Kearby | 252—466 |
| 3,016,347 | 1/1962 | O'Hara | 252—466 |
| 3,075,915 | 1/1963 | Arnold et al. | 208—216 |
| 3,114,701 | 12/1963 | Jacobson et al. | 252—439 X |

OTHER REFERENCES

Kearby et al.: Indust. and Engr. Chem., vol 30, pages 1082–1086 (1938).

MILTON WEISSMAN, *Primary Examiner.*

MAURICE BRINDISI, OSCAR R. VERTIZ, *Examiners.*

R. M. DAVIDSON, A. J. GREIF, *Assistant Examiners.*